WE23 XR 4,511,926

United States Patent [19]

Crossland et al.

[11] Patent Number: 4,511,926

[45] Date of Patent: Apr. 16, 1985

[54] SCANNING LIQUID CRYSTAL DISPLAY CELLS

[75] Inventors: William A. Crossland, Harlow; Peter W. Ross; Peter J. Ayliffe, both of Bishop's Stortford, all of England

[73] Assignee: International Standard Electric Corporation, New York, N.Y.

[21] Appl. No.: 481,050

[22] Filed: Mar. 31, 1983

[30] Foreign Application Priority Data

Apr. 1, 1982 [GB] United Kingdom ................ 8209708

[51] Int. Cl.[3] ........................................ H04N 5/66

[52] U.S. Cl. ................................ 358/236; 358/241; 340/784

[58] Field of Search .................... 358/236, 241, 230; 340/784, 765; 307/246; 357/45

[56] References Cited

U.S. PATENT DOCUMENTS

| | | | |
|---|---|---|---|
| 3,824,003 | 7/1974 | Koda | 358/236 |
| 4,368,523 | 1/1983 | Kawate | 340/784 |

OTHER PUBLICATIONS

A Pocketbable Liquid Crystal TV Receiver, by N. Kokado, et al., IEEÉ Transactions on Consumer Electronics, vol. CE-27, No. 3, Aug. 1981, pp. 462-469.

*Primary Examiner*—Tommy P. Chin
*Attorney, Agent, or Firm*—T. L. Peterson; J. M. May

[57] ABSTRACT

A curtailed drive scheme for a matrix array liquid crystal display cell in which the field developed across each picture element is maintained for only a fraction of the time interval between consecutive addressings. This reduces the effects of differences in time constants across the display for addressing schemes in which the average time constant is short compared with this time interval between consecutive addressings.

5 Claims, 9 Drawing Figures

SCANNING LIQUID CRYSTAL DISPLAY CELLS

BACKGROUND OF THE INVENTION

This invention relates to liquid crystal cells in general, and more particularly to scanning liquid crystal display cells.

There are already known cells of the above type which include picture elements (pels) that are arranged in a matrix array, and in which the liquid crystal layer is sandwiched between an electroded transparent front sheet and a rear sheet formed by or carrying a semiconductive layer provided with access circuitry by which the display is addressed on a line-by-line basis via a matrix array of semiconductor gates directly or indirectly connected with an overlying matrix array of liquid crystal cell electrode pads.

One addressing scheme for driving this type of display cell is described in the specification of British Patent Application Ser. No. 2078422A, to which attention is directed. In that scheme a voltage square wave is applied to the front electrodes in order to increase the available drive voltage across the liquid crystal layer for a given drive voltage within the semiconductive layer; and a method of blanking is disclosed that involves the turning off of all picture elements between consecutive addressings that occur respectively before and after a voltage change of the front electrode. This blanking minimizes the rms voltage seen by 'OFF' elements of the display. The scheme is particularly suitable for binary type displays in which picture elements are either fully 'ON' or fully 'OFF', and which have a fast data input that allows the reduction in rms voltage seen by 'ON' elements of the display to be minimized by having a rewrite period that is short compared with the cycle time of the voltage square wave applied to the front electrode.

The present invention is concerned with an alternative addressing scheme which does not involve the application of an alternating voltage to the front electrode, and so is better suited for some applications in which there is a fixed format of data input which involves relatively longer rewrite periods, such as that encountered in broadcast television. One of the particular problems associated with displaying broadcast television pictures is that the field repetition rate is fixed at 50 Hz, and so refreshes only occur every 20 ms. Retaining a charge on a picture element electrode pad for this period of time without significant voltage droop implies a substantial time constant. The need to avoid a significant voltage droop arises partly from the need to minimize the residual rms voltage seen by 'OFF' elements of the display, and partly from the need to minimize the variations in the rms voltage seen by 'ON' elements as a result of differences in time constants.

Voltage droop is caused by the combined effect of liquid crystal resistance and transistor leakage, and also depends upon the capacitance associated with the individual electrode pads. This capacitance depends upon the area of the pad, and hence voltage droop increases as the electrode pad size is reduced. The transistor leakage component is typically somewhat variable over the surface of a conventional silicon wafer, and this can cause different rms voltages to be seen by different picture elements at different points in the display when they are supposed to be identical. As the electrode pad size is reduced beneath about 150 $\mu m \times 150$ $\mu m$, these differences become visually too obtrusive to be satisfactory for many types of applications involving refreshing at 50 Hz. However, displays with electrode pads smaller than this are commercially attractive because many devices can be fabricated from a single semiconducor wafer.

One way of overcoming this problem is to include a storage capacitor at each electrode pad, but this significantly complicates the manufacture, and thereby aggravates the problem of manufacturing yield.

SUMMARY OF THE INVENTION

Accordingly, it is a general object of the present invention to avoid the disadvantages of the prior art.

More particularly, it is an object of the present invention to develop a method of operating a display device, which does not possess the disadvantages of the conventional methods of this kind.

Still another object of the present invention is to develop a method of the type here under consideration in accordance with which the previously present problems associated with the potential droop and relatively short time constants are ameliorated.

In pursuance of these objects and others which will become apparent hereafter, one feature of the present invention resides in a method of operating a matrix array liquid crystal display device including a liquid crystal layer sandwiched between a transparent front sheet provided with an electrode and a rear sheet provided with a matrix array of electrode pads that define respective picture elements, and an access circuitry including a matrix array of gates individually connected to the elecrode pads and operative for supplying selected potentials thereto in accordance with the information to be displayed, comprising the steps of maintaining the front sheet electrode at a substantially constant reference potential; repetitively addressing each of the electrode pads via the associated gate; supplying the selected potential to the respective electrode pad through the associated gate during the addressing step; closing the associated gate after the addressing step for a predetermined period of time; opening the associated gate at least once following the predetermined period of time; discharging the respective electrode pad with respect to the front sheet electrode during the opening step through the associated gate; and reclosing the associated gate after the discharging step until the next following addressing step.

BRIEF DESCRIPTION OF THE DRAWINGS

The above-mentioned and other features and objects of the invention will become more apparent by reference to the following description taken in conjunction with the accompanying drawing in which.

DETAILED DESCRIPTION OF THE PREFERRED EMBODIMENTS

Figure 1:
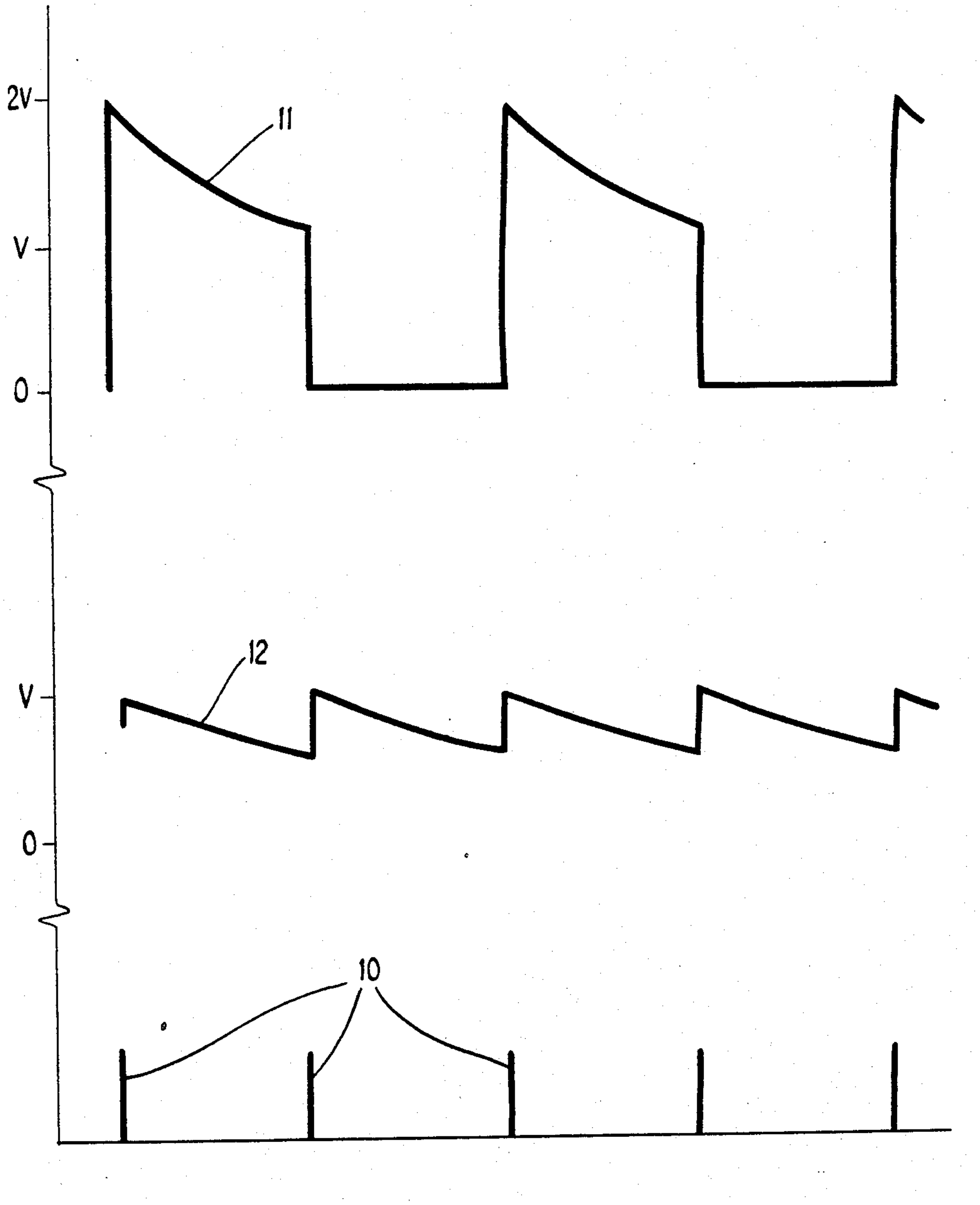
FIG. 1 is a graphic representation of waveforms for an uncurtailed addressing scheme.

Referring now to the drawing in detail, and first to FIG. 1 thereof, it may be seen that it depicts the voltage waveforms applied to the electrode pads of 'ON' and 'OFF' picture elements or pels using a drive scheme in which the 'OFF' pads are addressed by voltage V, and 'ON' pads are addressed alternatively by voltages 2 V and 0 so as to be alternately positive and negative with respect to the display cell front electrode voltage which is held at a voltage V. These voltages are applied to the pads by short duration pulses 10 that momentarily open the gate of an FET associated with each pad. The repetition frequency of these pulses applied to a particular pad is set by the video signal, and is typically 50 Hz. FIG. 1 depicts the situation in which an attempt is made to hold the charge applied to the pad during one pulse until it is refreshed by that applied by the next pulse, and in which the leakage of charge from the pad provides a time constant that is short compared with the interval between consecutive pulses 10. The voltage waveform 11 of an 'ON' pad is asymmetrical about the front electrode potential and hence it is necessary to ensure the integrity of a dielectric layer to prevent the passage of direct current through the liquid crystal layer. Similarly the waveform 12 of an 'OFF' pad is asymmetric about the front electrode, but in this instance a generally more important consideration is the fact that the leakage results in an unwanted residual drive waveform appearing across the picture element, or pel for short. If the time constant were the same for all pels across the surface of the display, the magnitude of this residual drive would be the same all over the display, and hence capable of being cancelled out by an offset voltage of the appropriate amount applied to the front electrode. In practice, however, transistor leakage is generally found to vary significantly over the suface of a semiconductor wafer, and hence this simple approach of a voltage offset will not achieve the desired result in situations where transistor leakage is the dominant factor in determining the leakage time constant of the electrode pads.

Figure 2:
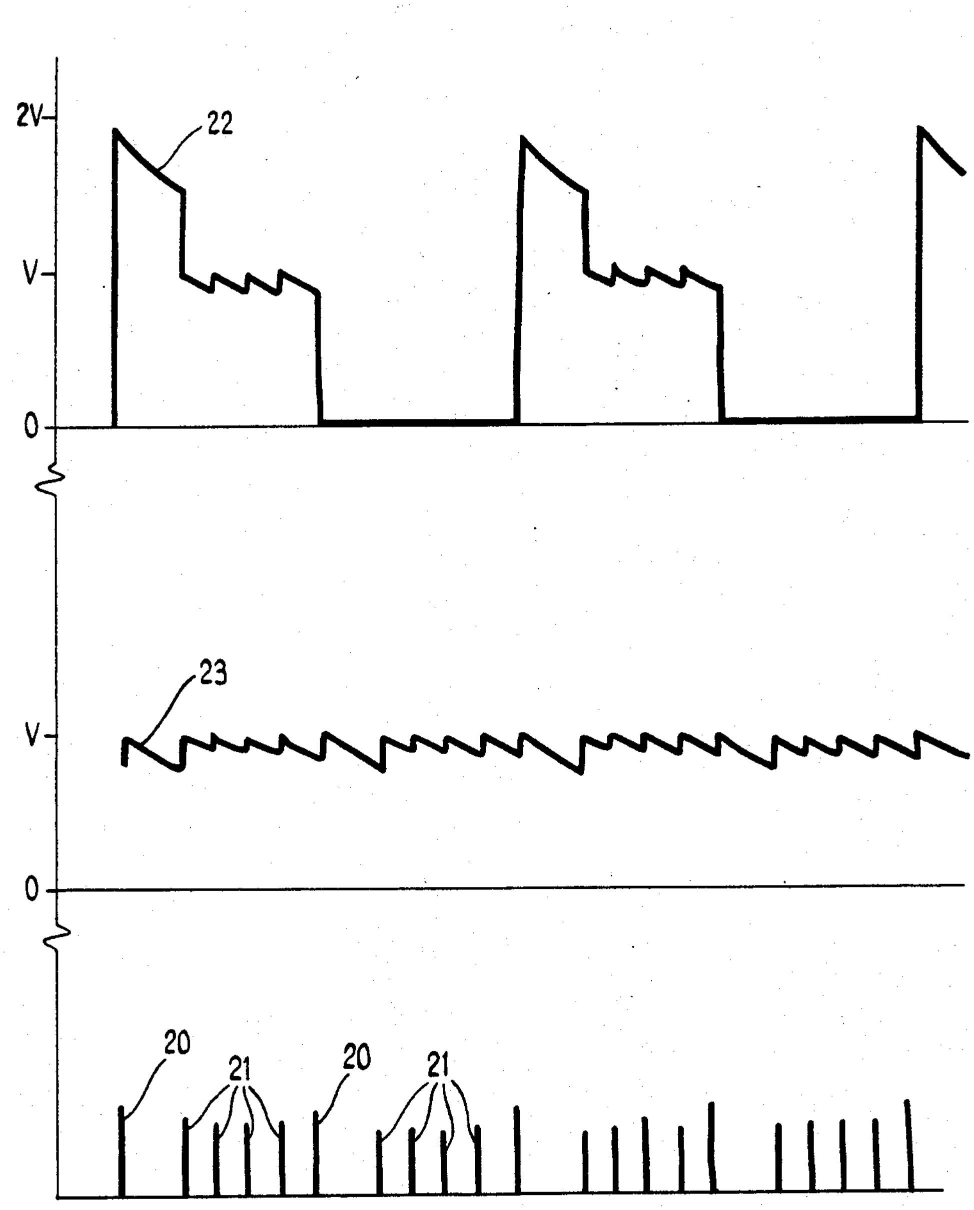
FIGS. 2 and 3 are graphic representations of waveforms for two alternative curtailed addressing schemes according to the present invention.

FIG. 2 shows how the rms voltage seen by 'OFF' elements is reduced by curtailing the hold period. In this instance successive gating pulses 20 by which the electrode pads are addressed are interspersed by trains of 'blanking' pulses 21, which take the pads to the potential of the front electrode. The resulting waveforms of the electrode pad voltages of 'ON' and 'OFF' are shown respectively by traces 22 and 23. The rms voltage seen by 'ON' elements is also reduced. This is no disadvantage provided that the device can be driven harder to compensate for this reduction, in which case there is the advantage that the proportional difference in rms voltage seen by 'ON' elements having different time constants is reduced. This is particularly useful in display devices which provide a gray-scale by using non-saturating drive conditions. The choice of ratio of the hold period to the time interval between consecutive addressings of an individual pel will depend upon the application having particular regard to the pel size, liquid crystal electro-optic mode employed and to the available drive voltages. Typically this ratio will be less than one half and preferably less than one third in order to provide a significant improvement in display characteristics.

Figure 3:
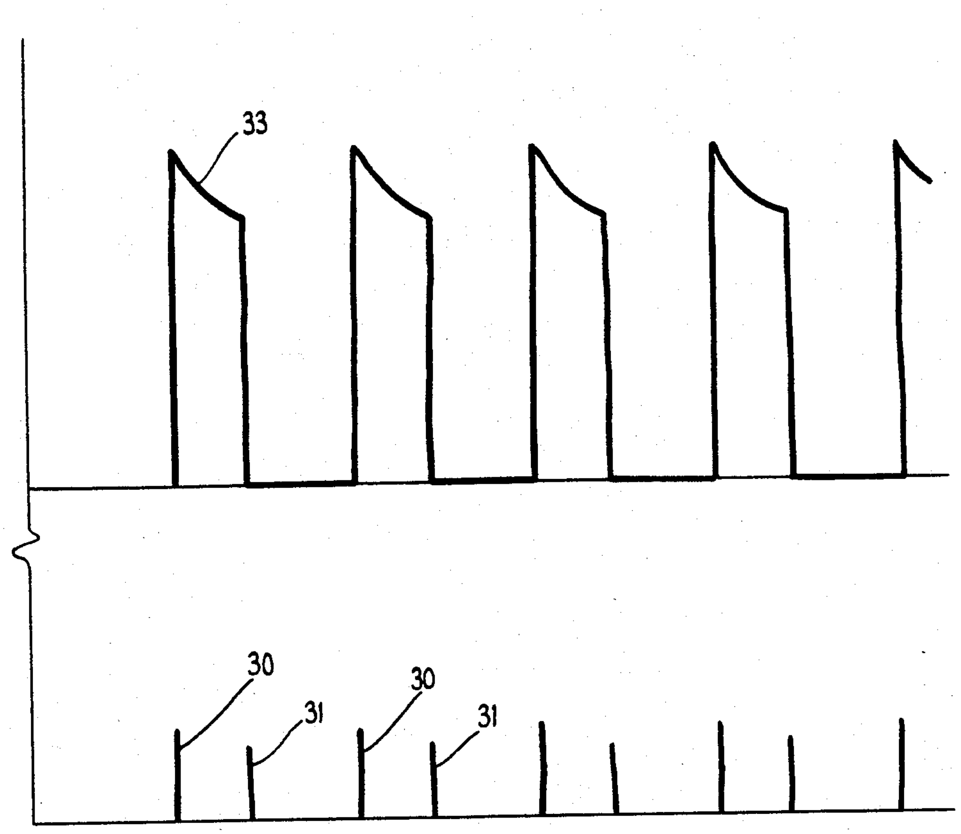

Curtailing of the 'hold' period can also be used to provide an attenuating voltage component allowing the display to be driven by unidirectional pulsing of 'ON' elements using waveforms as depicted in FIG. 3. In this instance the front electrode is held at 0 volts, the substrate potential of the semiconductor layer. This means that the electrode pads of 'OFF' elements are not subject to transistor leakage. 'ON' elements are addressed by gating pulses 30, and these are interspersed with blanking pulses 31 which take the pads back to the semiconductor layer substrate potential. The resulting waveform 33 of the electrode pad voltage of 'ON' elements will have its alternating component maximized by choosing to curtail the hold period to about half the interval between consecutive addressings, but if it is curtailed more strongly it will again be evident that the proportional difference in rms voltage seen by 'ON' elements having different time constants will be reduced. The absence of transistor leakage after the blanking pulse 31 has taken the electrodes to the semiconductor layer substrate potential means that in this instance there is no particular advantage in providing more than one blanking pulse 31 between consecutive addressing pulses 30.

Several different electro-optic liquid crystal effects involving dichroic dyes are possible for a display cell having its liquid crystal layer backed by an active silicon wafer. These include the dyed nematic without front polarizer, the dyed nematic with front polarizer, and the dyed cholesteric-nematic phase change modes of operation. The dyed nematic without front polarizer suffers from the disadvantage that, although the brightness is good, the contrast is poor. This is because only one of the two principal planes of polarization of light through the crystal is subject to absorption by the dye, and thus about half the light is transmitted unchanged. Dyed nematics using a single front polarizer avoid this problem by filtering out the mode of propagation that is not attenuated by the dye. This gives an excellent contrast ratio, but a heavy penalty is paid in terms of brightness due to the absorption of light in the polarizer. For this reason dyed nematic displays with a front polarizer can look excellent in transmitted light, but reflected light displays only appear to be attractive in situations where there is strong front illumination. The conventional dyed phase change display avoids both these particular problems, but exhibits hysteresis in its switching which makes it difficult to reproduce gray-scales. For this reason it is generally preferred to use a dyed nematic without front polarizer but with chiral additive. The amount of chiral additive in this instance is more than is typically used in a dyed nematic for the purpose of shortening the switching time and optionally for the purpose of avoiding the problems of reverse twist. On the other hand it is less than that typically used in conventional phase change cell, where it is present in a proportion typically providing between three and five full turns of twist in the thickness of the liquid crystal layer. In this instance, it is present in a proportion giving about 360° of twist, this amount being found a reasonable compromise in providing sufficient additive to give a significant improvement in contrast over the conventional dyed nematic without front polarizer, without introducing excessive hysteresis characteristic of a conventional phase change cell.

Figure 4:
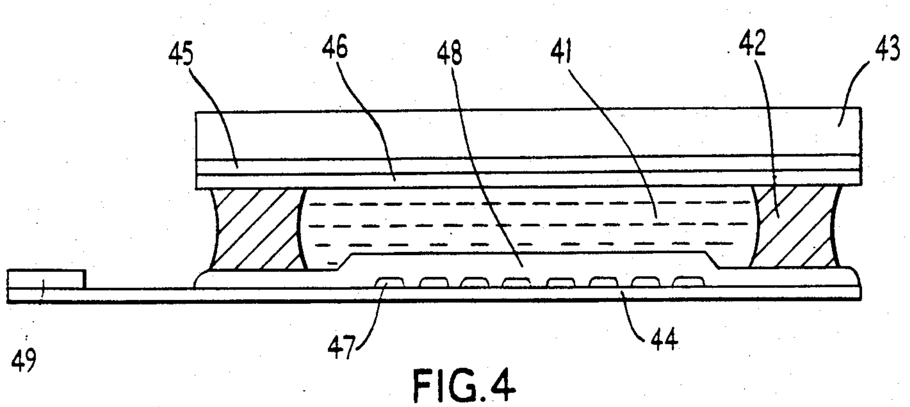
FIG. 4 is a schematic cross-section through the display cell.

Referring to FIG. 4, a liquid crystal on silicon cell, which may be a dyed nematic on silicon cell with chiral additive, is constructed by forming an envelope for a layer 41 of liquid crystal by sealing together with an edge seal 42 a glass sheet 43 and a single crystal wafer 44 of silicon. The edge seal 42 may be a plastics seal, thereby avoiding some of the alignment problems associated with the use of high temperatures used in the provision of glass frit edge seals. The glass sheet 43 is provided with an internal transparent electrode layer 45 which is covered with a transparent insulating layer 46 designed to prevent the passage of direct current through the cell. The silicon wafer 44 is provided with a matrix array of metal electrode pads 47 which is similarly covered with a transparent insulating layer 48. The exposed surfaces of the two insulating layers 47 and 48 are treated to promote, in the absence of any disturbing applied field, a particular alignment state of the adjacent liquid crystal molecules. Parallel homogeneous alignment is used if the chosen display mode is dyed nematic, in which case the nematic material may incorporate a chiral additive providing a twist of not more than about 360° or the twist may be provided by appropriate relative orientation of the two alignment directions. Within the area defined by the edge seal 42, the silicon slice 44 is held spaced a precise distance from the glass sheet 43 by means of short lengths of glass fibre (not shown) trapped between the two adjacent surfaces so as to provide the liquid crystal layer 41 with a uniform thickness of typically 10 to 12 microns. Beyond the confines of the edge seal 42, the silicon wafer 44 is provided with a small number of pads 49 by which external electrical connection may be made with the circuitry contained within the wafer 44.

Figure 5:
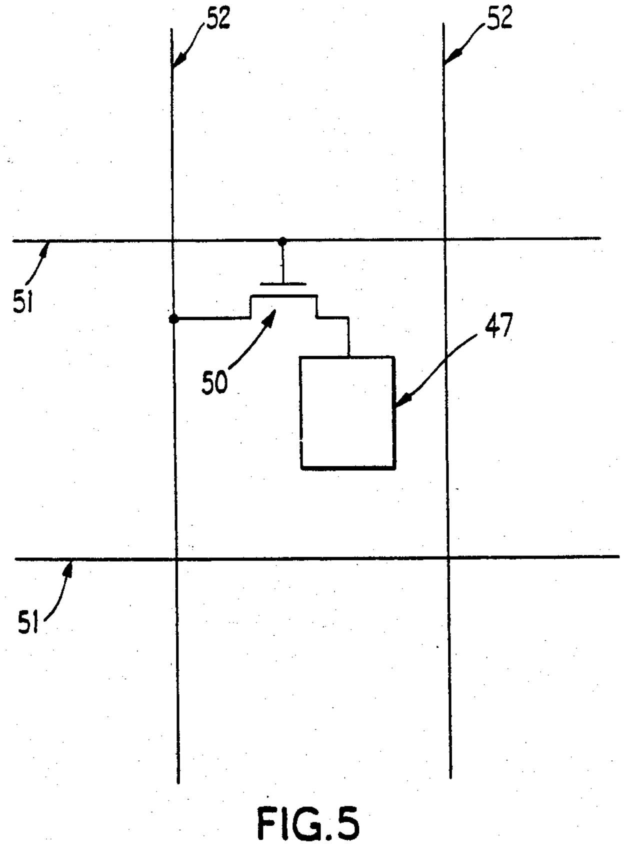
FIG. 5 is a diagrammatic view of the basic picture element circuitry.

A particular pel is driven into the 'ON' state by applying a potential to its pad 47 that is different from the potential applied to the front electrode 45. Each pad 47 is connected to the output of a MOS FET switch formed in the wafer 44 so that when the FET is conducting the pad 47 can be charged up to a sufficient potential relative to that of the front electrode 45 to activate the liquid crystal to the required extent. The FET is then turned off to isolate the pad 47 until discharged with respect to the front electrode 45 by a blanking pulse. Other pads 47 of the array are being charged both before and after the blanking. The pad 47 is recharged with respect to the front electrode 45 after a complete cycle. The arrangement of an FET in relation to its associated pad 47 and access lines is represented in FIG. 5. Each pel pad 47 is connected to the drain of its associated FET 50 whose gate and source are respectively connected to the associated row and column access lines 51 and 52. The display is written line by line, with the data appropriate to each line being applied in turn to the column access lines, source lines 52, while the row access lines, gate lines 51 are strobed. In choosing how to make the access lines 51 and 52, it is important to have regard to electrical rise times, power consumption, and yield in manufacture. Three types of conductors were considered: metal, polysilicon, and diffusion. Metal lines have the shortest rise times (typical resistance is 0.03 ohms per square and capacitance about $2\times10^{-5}$ $Fm^{-2}$), followed by polysilicon lines (resistance 20–50 ohms per square and capacitance about $5\times10^{-5}$ $Fm^{-2}$). Diffusion lines have lower resistance (about 10 ohms per square) but higher capacitance (about $3.2\times10^{-4}$ $Fm^{-2}$). The source lines 52 require the shortest rise time (particularly when the display is being blanked) and hence it is preferred to make them of metal throughout, and to make the gate lines 51 of metal except at the crossovers where diffusion line sections are used.

The access lines 51, 52 are connected to drive circuitry at least a part of which is conveniently fabricated on the silicon wafer 44 so as to reduce the number of external electrical connections that need to be made with the wafer 44.

Figure 6:
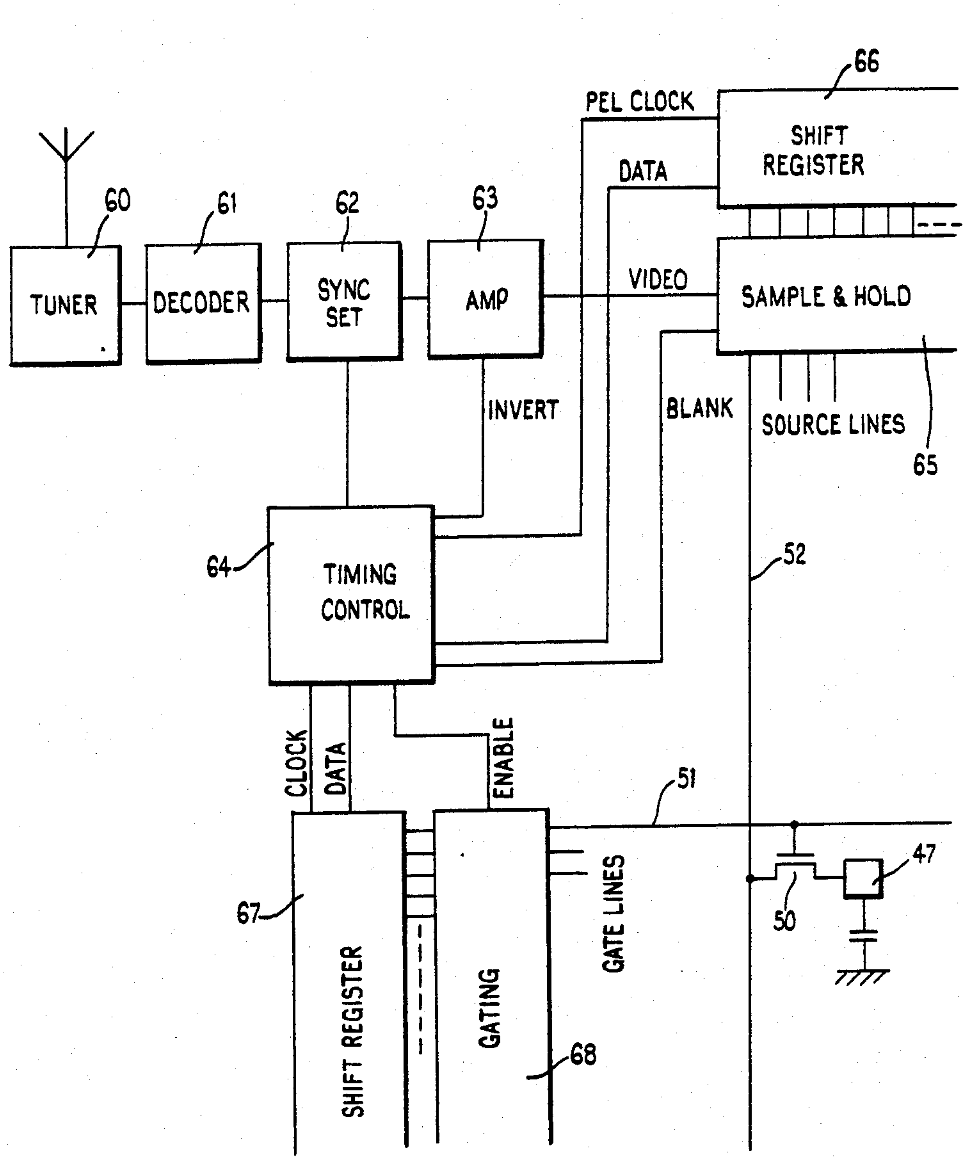
FIG. 6 is a block diagram of the drive circuitry.
Figure 7:
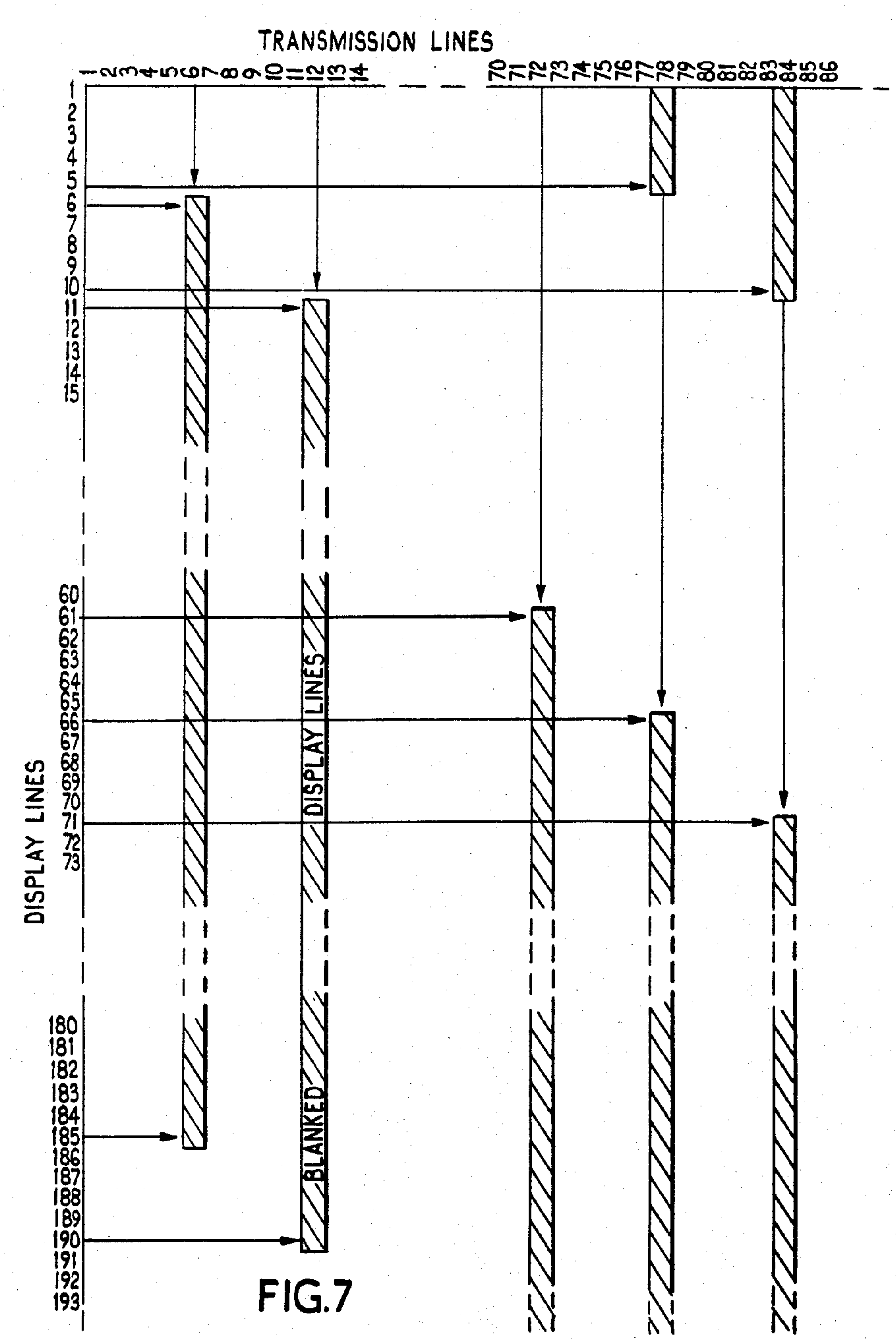
FIG. 7 is a diagrammatic view of the line writing and line blanking schedule of the display.

FIG. 6 is a block diagram of an example of circuitry that can be used to generate the requisite waveforms described previously with particular reference in FIG. 2 for a video transmission signal having a 288 line display format of which 240 lines are displayed by this display, with the time intervals allocated to the remaining 48 lines, one in every six, being used for blanking purposes. FIG. 7 depicts the blanking scheme in further detail. This Figure indicates that video transmission signal lines 1 to 5 are normally entered onto the display in time intervals 1 to 5 where they are displayed as display lines 1 to 5, and then in the time interval allocated to line 6 of the video signal, three quarters of the displayed lines, namely display lines 6 to 185 are blanked. Then transmission signal lines 7 to 11 are entered onto the display as display lines 6 to 10 before the next blanking in the time interval allocated to transmission signal line 12, which is uesd to blank display lines 11 to 190. This process continues in the same fashion, so that transmission signal line 71 is displayed as display line 60 and then display lines 61 to 240 are blanked. Then, after transmission signal line 77 is displayed as display line 65, display lines 66 to 240 and display lines 1 to 5 are blanked in the time interval allocated to transmission signal line 78. Thus when a line is entered on the display it is retained for approximately one quarter of a frame period, and then for the remaining three quarters it is repetitively blanked at times corresponding to every sixth transmission signal line.

Reverting attention to FIG. 6, the broadcast signal is received by a tuner 60 and fed to decoder 61 from where the signal is fed to a sync separator 62 which applies the video signal to an amplifier 63, and the sync signals to a timing control circuitry 64.

The video signal output from the amplifier 63 is fed to a sample and hold circuit 65 provided with as many stages as there are source lines 52 of the display. The operation of the sample and hold circuit is controlled by a shift register 66 having a single circulating '1' in a field of '0's, which is in its turn controlled by the timing control circuitry 64. This shift register 66 thus operates to distribute the appropriate sections of one video signal line trace to the appropriate source lines.

When a line of data stored in the sample and hold circuit 65 is to be entered onto the display, the timing control circuitry 64 enters a single '1' into a field of '0's into a shift register 67 which is then applied to the appropriate gate line 51 via an enabling gate 68.

The timing control circuitry 64 applies a blanking signal to a second input of the sample and hold circuit 65 at every sixth transmission signal video line trace. This blanking signal inhibits the video signal input and sets all the stages of the circuit to the display cell front electrode potential. At the same time the shift register 67 is three quarters filled with '1's, so that when the timing control circuitry 64 applies a pulse to the enabling gate 68 the appropriate three quarters of the display lines are blanked.

On every alternate frame the timing control also applies a signal to the amplifier 63 causing its output to be inverted, so that the video signal voltages applied to the individual pel pads 47 via their associated FET's 50 alternate at half the frame frequency in order to provide the requisite alternating drive for the liquid crystal layer 41.

Figure 8:
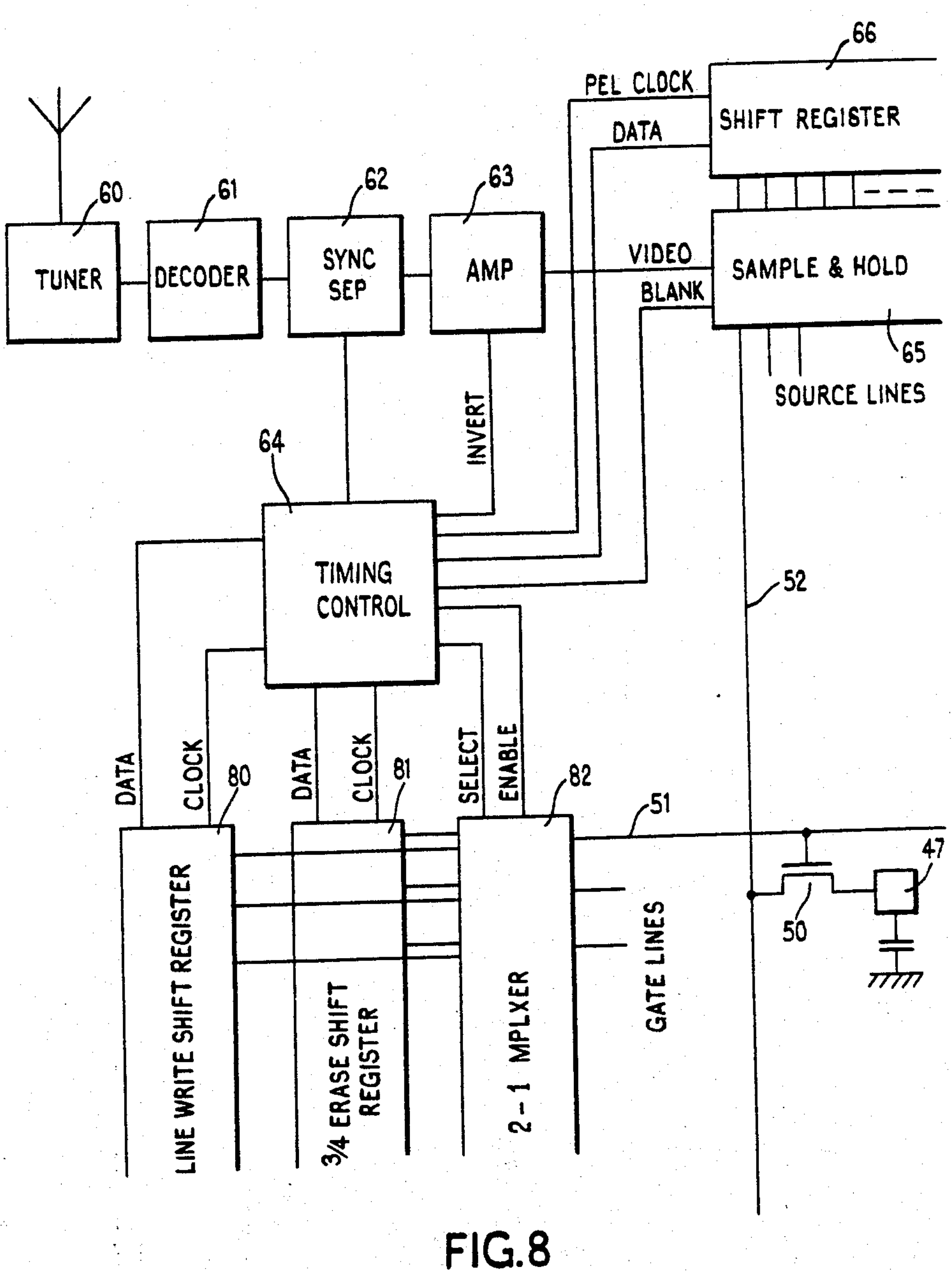
FIGS. 8 and 9 are block diagrams of alternative drive circuitry configurations that may be used instead of the circuitry of FIG. 6.

FIG. 8 depicts a modified version of the circuitry just described with reference to FIG. 6. The modification concerns the use of two shift registers 80 and 81 to control the gate lines 52 instead of the single shift register 67. These feed an enabling 2-1 multiplexer 82 instead of the enabling gate 68. The shift register 80 controls the line writing and at all times contains a single '1' circulating in a field of '0's, while the shift register 81 is three quarters full of circulating '1's and controls the blanking.

Figure 9:
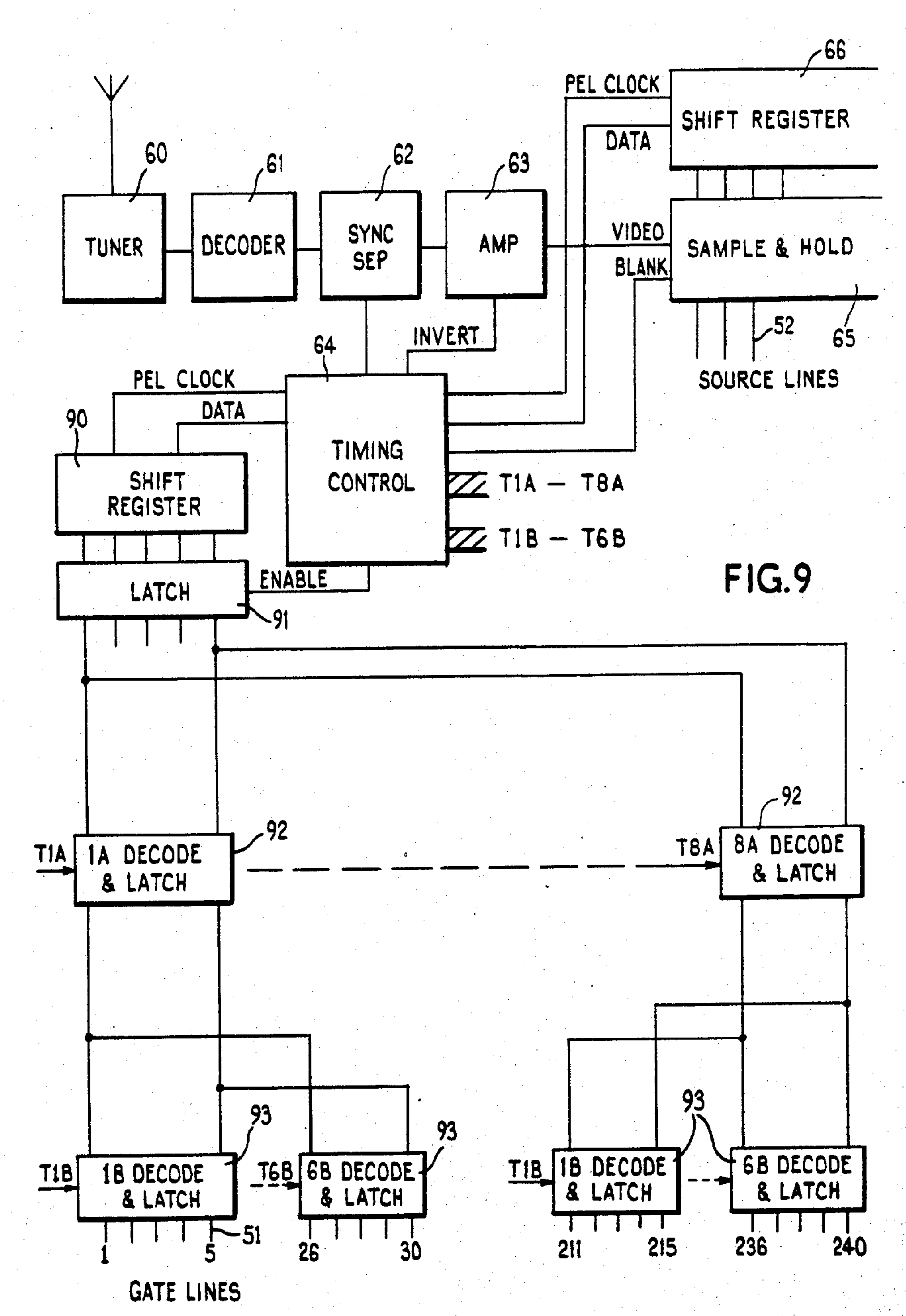

FIG. 9 depicts a further alternative to the circuitry of FIG. 6. Here a two-level decode tree is used for accessing the gate lines. The timing control circuitry provides a data input for a 5-stage shift register 90 feeding a latch enable circuit 91. This latch enable circuit feeds eight decode and latch circuits 92 in parallel, and each of these feeds a set of six further decode and latch circuits 93 to provide the requisite 240 inputs for the gate lines 51.

While we have described above the principles of our invention in connection with a specific arrangement, it is to be clearly understood that this description is made only by way of example and not as a limitation to the scope of our invention as set forth in the objects thereof and in the accompanying claims.

We claim:

1. A method of operating a matrix array liquid crystal display device including a liquid crystal layer sandwiched between a transparent front sheet provided with an electrode and a rear sheet provided with a matrix array of electrode pads that define respective picture elements, and an access circuitry including a matrix array of gates individually connected to the electrode pads and operative for supplying selected potentials thereto in accordance with the information to be displayed, comprising the steps of:

maintaining the front sheet electrode at a substantially constant reference potential;

repetitively addressing each of the electrode pads via the associated gate;

supplying the selected potential to the respective electrode pad through the associated gate during said addressing step;

closing the associated gate after said addressing step for a predetermined period of time;

opening the associated gate at least once following said predetermined period of time;

discharging the respective electrode pad with respect to the front sheet electrode during said opening step through the associated gate; and reclosing the associated gate after said discharging step until the next following addressing step.

2. The method as defined in claim 1, wherein said supplying step includes varying the level of the selected potential supplied to the electrode pads which are to be activated to turn the respective picture elements on between above and below the reference potential during alternating ones of said addressing steps; and further comprising the step of repeating said closing, opening and discharging steps at least once prior to said reclosing step.

3. The method as defined in claim 1, wherein said supplying step includes keeping the level of the selected potential supplied to the electrode pads which are to be activated to turn the respective picture elements on substantially constant; and wherein said closing, opening and discharging steps are performed only once prior to said reclosing step.

4. The method as defined in claim 1, wherein said closing step includes closing the associated gate for a period of time amounting to less than a half of the time interval between the respective addressing step and the next following addressing step.

5. The method as defined in claim 4, wherein said closing step includes closing the associated gate for a period of time amounting to less than a third of the time interval between the respective addressing step and the next following addressing step.

* * * * *